United States Patent [19]

Vahrenwald et al.

[11] Patent Number: 4,873,740
[45] Date of Patent: Oct. 17, 1989

[54] WIPING MIRROR ASSEMBLY

[76] Inventors: Michael C. Vahrenwald, 2816 Terry Lake Rd.; John A. Brown, 612 Agape Way, both of Fort Collins, Colo. 80524

[21] Appl. No.: 21,478
[22] Filed: Mar. 4, 1987
[51] Int. Cl.⁴ .............................. B60S 1/26; B60S 1/44
[52] U.S. Cl. ................................ 15/250 B; 15/250.29; 15/250.26; 15/250.01; 74/424.8 R
[58] Field of Search ............ 15/250 B, 250.29, 250.26, 15/250.01, 250.24, 250.36, 250.42; 74/424.8 R

[56] References Cited

U.S. PATENT DOCUMENTS

| | | | |
|---|---|---|---|
| 1,509,620 | 9/1924 | Taylor | 15/250.26 |
| 1,723,189 | 8/1929 | Martin | 15/250.26 X |
| 1,743,713 | 1/1930 | Geremia | 15/250.26 |
| 2,885,708 | 5/1959 | Presser | 15/250.26 X |
| 2,913,754 | 11/1959 | Vander Zee . | |
| 3,526,920 | 9/1970 | Boyanich, Sr. . | |
| 3,612,647 | 10/1971 | Laprairie . | |
| 3,618,156 | 11/1971 | Riggs . | |
| 3,685,087 | 8/1972 | Pittman . | |
| 3,855,661 | 12/1974 | Prince . | |
| 3,866,258 | 2/1975 | DeGraw . | |
| 4,037,286 | 7/1977 | Medearis et al. | 15/250 B X |
| 4,212,091 | 7/1980 | Jones . | |
| 4,306,328 | 12/1981 | Layton . | |
| 4,339,169 | 7/1982 | Addison, Jr. . | |
| 4,457,597 | 7/1984 | De Gideo . | |
| 4,459,718 | 7/1984 | Hewitt et al. . | |

FOREIGN PATENT DOCUMENTS

| | | | |
|---|---|---|---|
| 387918 | 1/1924 | Fed. Rep. of Germany | 74/424.8 R |
| 978450 | 12/1964 | United Kingdom | 15/250 B |
| 2065459 | 7/1981 | United Kingdom | 15/250 B |

Primary Examiner—Peter Feldman
Attorney, Agent, or Firm—Luke Santangelo

[57] ABSTRACT

An improved rear-view wiping mirror assembly is described in which a rear-view mirror has placed against it a horizontal wiper connected at both ends to a bracket. The wiper is driven in oscillation by a vertically-positioned improved helical screw having expanded reversing grooves and a tanged cylinder member. The entire drive mechanism is contained within a sealed enclosure which includes yieldable seals through which the bracket oscillates. Ease of manufacture and reliability are enhanced through minimization of parts, molding of the oscillation mechanism, and utilization of a single connecting rod/guide rod member.

56 Claims, 4 Drawing Sheets 4,873,740

WIPING MIRROR ASSEMBLY

BACKGROUND OF THE INVENTION

1. Field of the Invention

This invention relates to mirrors which incorporate oscillating wipers to keep the mirrored surface visually clear. It involves an assembly which includes an oscillating drive mechanism utilizing a helical screw in such a fashion as to be easily manufactured and reliable in use. The helical screw may include progressively flaired reversing grooves and nut and tanged cylinder members. The entire drive mechanism may be housed in a sealed environment to promote reliability and durability.

2. Description of the Related Art

In 1959, U.S. Pat. No. 2913754 was granted to Vander Zee for a wiping device for outside rearview mirrors. This wiping device utilized rotational oscillation to drive a wiper connected at only one point to the oscillating mechanism.

Boyanich was granted U.S. Pat. No. 3526920 for a rearview mirror wiper. This invention improved upon the Vander Zee patent in that the wiper was attached at two points and was not driven through rotational oscillation. It did, however, utilize slot and pinion members for transmitting the oscillation to the wiper mechanism. No means was provided to seal the drive mechanism.

Laprairie described a rearview mirror and rotatably wiped enclosure in U.S. Pat. No. 3612647. This patent involved a housing in which the wiper did not contact the mirrored surface, but rather contacted and wiped a cylindrical transparent housing surrounding the mirrored surface.

Pittman through U.S. Pat. No. 3685087 described a rearview mirror wiper mechanism in which a chain drive assembly transmits oscillation to one end of an arm of the wiper mechanism. Although the drive assembly is enclosed by a housing, no means for sealing the mechanism is provided.

Riggs through U.S. Pat. No. 3618156 describes a power wiper for rearview mirrors which incorporates a complex slot and pinion drive assembly. Again, although the drive mechanism is surrounded by a housing, no means to seal that environment is provided.

Prince in U.S. Pat. No. 3855661 describes an automotive rearview cleaning device. This device incorporates a rotating spirally-grooved rod to drive a wiper arm. The oscillating forces are transmitted from the unsealed drive mechanism to only one end of the wiper. In addition, an external electric motor is remotely mounted on the vehicle. This motor rotates the spirally grooved rod through a flexible shaft and drives the wiper arm through a slidable pin.

DeGraw in U.S. Pat. No. 3866258 describes a wiper assembly. This assembly incorporates hydraulic drive cylinders and a spring return mechanism to drive a wiper through external arms.

Wagenhofer in U.S. Pat. No. 3968537 describes a wiping blade device for truck rearview mirrors. This device incorporates a detachable drive mechanism which is designed to drive a wiper arm from one end of that arm and is designed in such a fashion as to attach to existing mirrors, not as an integral unit.

Jones in U.S. Pat. No. 4212091 describes a wiper apparatus for a viewing surface. This apparatus is hydraulically driven. It includes fluid cylinders and piston rods which are actuated alternatively to create oscillation of the wiper mechanism.

Layton in U.S. Pat. No. 4306328 shows a wiper apparatus including parallel chain drives. These chain drives are not enclosed nor are they in a sealed environment.

Addison in U.S. Pat. No. 4339169 describes a rearview mirror and wiper assembly for vehicles. This wiper assembly is driven by a rotating arm assembly which includes guiding rods and cylindrical housings which are bearing supported. No means for sealing the drive mechanism is described.

Hewitt in U.S. Pat. No. 4459718 describes a fluid pressure operating reciprocating mechanism. This mechanism involves the use of external hydraulic pressure to drive a directional spool in oscillation through the use of selectively switched hydraulic valves.

Finally, DeGideo in U.S. Pat. No. 4457597 describes a self-cleaning side view mirror. This mirror includes a free-floating wiper arm which is designed to be manually moved back and forth as desired.

As these various patents disclose, the simple combination of a mirror and oscillating wiper has been the subject of invention for some time. Prior to the present invention, however, no device has been invented which appropriately combines ease of manufacture, cost of manufacture, reliability, and consumer usefulness. As the mere extent of relevant art indicates, there has been a longstanding recognition that such features in a device is desirable. In spite of this need, the evident lack of commercial success of preexisting devices indicates that the proper combination of manufacturing, cost, and user criteria has yet to exist. None of the existing devices properly address all three of these criteria. While there have been substantial attempts by others, they either have not recognized the need to satisfy all of these criteria or have been unable to combine features in a device which achieves the proper balance. In fact, prior to the most recent patent by DeGideo, which itself is manually operated, there was a clear trend toward increasing complexity by inventors in this field. The present invention not only properly balances the criteria necessary for commercial success, but it also adds many features which add value by either simplifying manufacture, minimizing costs, or enhancing the usefulness of the device.

Generally, the goals of the present invention are to provide a wiping mirror assembly which minimizes manufacturing difficulties, which allows introduction into the marketplace at a most competitive price, and which offers enhanced reliability and consumer features. The present invention accomplishes these goals through many objectives such as providing a wiping mirror assembly which is structurally sound, is available in a sealed package, which utilizes a highly reliable helical screw oscillating mechanism, which is designed so as to utilize inexpensively molded parts, which incorporates a wiper design that can be easily and inexpensively replaced, which may be driven by both electric and pneumatic motors, and in which utilization of a pneumatic motor can actually enhance the sealing characteristics of the sealed environment. Naturally, as is evident from this application, numerous other objects of the invention exist and are described herein.

Since this entire field of invention combines the art of wiping techniques and the art of oscillating drive mechanisms, it is important to note that the present invention offers substantial improvement in even both of these basic fields. In the field of wiping techniques, traditional wiper arms (as are used on almost all automobile windshields) have consisted of spring-loaded mechanisms attached on one end. This is a necessary result of both general aesthetics and the fact that many wiping surfaces consist of compound curves.

As it relates to the present application, traditional techniques are not only unnecessary but are undesirable. Complicated spring mechanisms can be avoided since the surface to be wiped is usually a flat plane. In addition, the structural integrity of the wiper's attachment to the oscillating drive mechanism is enhanced through attachment at both ends. Perhaps one of the most commercially important facets of the present invention is the fact that these improvements have been combined in a way that allows quick and inexpensive replacement of the wiper itself.

As it relates to the field of oscillating drive mechanisms, the present invention utilizes an improved helical screw drive mechanism. The helical screw is designed in a fashion that not only allows easy moldability but enhances reliability through the inclusion of progressively flaired reversing grooves. In addition, the nut and tanged cylinder members which cause the oscillating motion have improved contact area with the helical screw. This further enhances the reliability and durability of such devices.

SUMMARY OF THE INVENTION

The present invention relates, among other things, to an improved wiping mirror assembly and an improved oscillating drive mechanism. It is the object of the present invention to provide an easily retrofitable wiping mirror assembly which can be controlled remotely. This assembly may be designed in such a fashion as to provide a sealed enclosure for the drive mechanism. In addition, the present invention may also utilize an improved helical screw assembly having progressively flaired reversing grooves, nut, and tanged cylinder oscillating members. The tanged cylinder includes a tooth which may be elliptically shaped.

There are numerous additional aspects of the present invention which are further described in other parts of this description.

DESCRIPTION OF THE PREFERRED EMBODIMENTS

Figure 1:
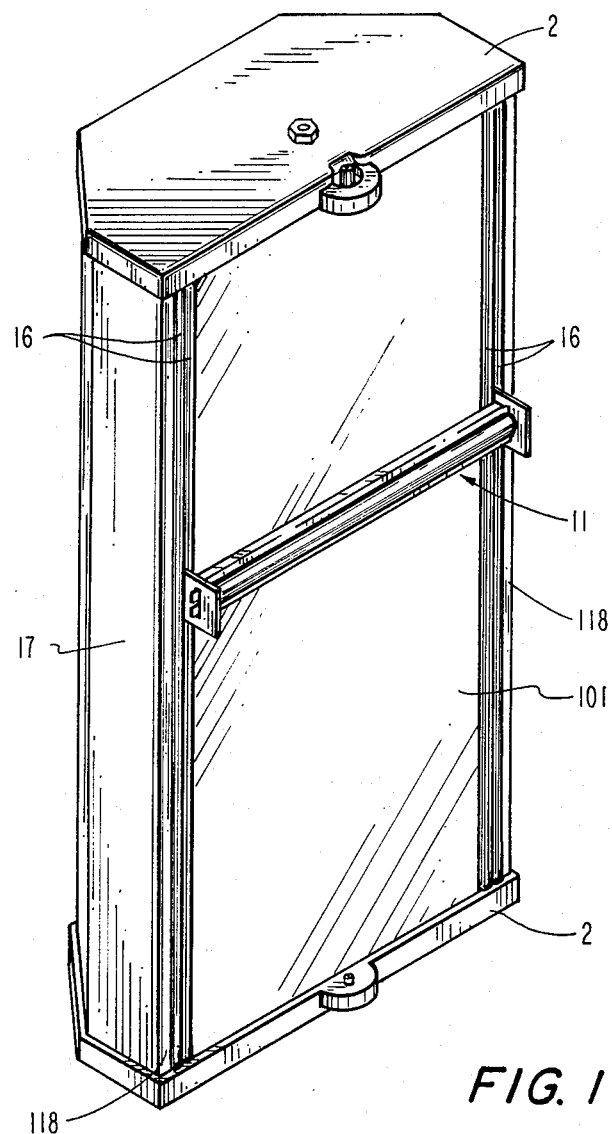
FIG. 1 is an overall view of the entire device embodying the present invention.
Figure 2:
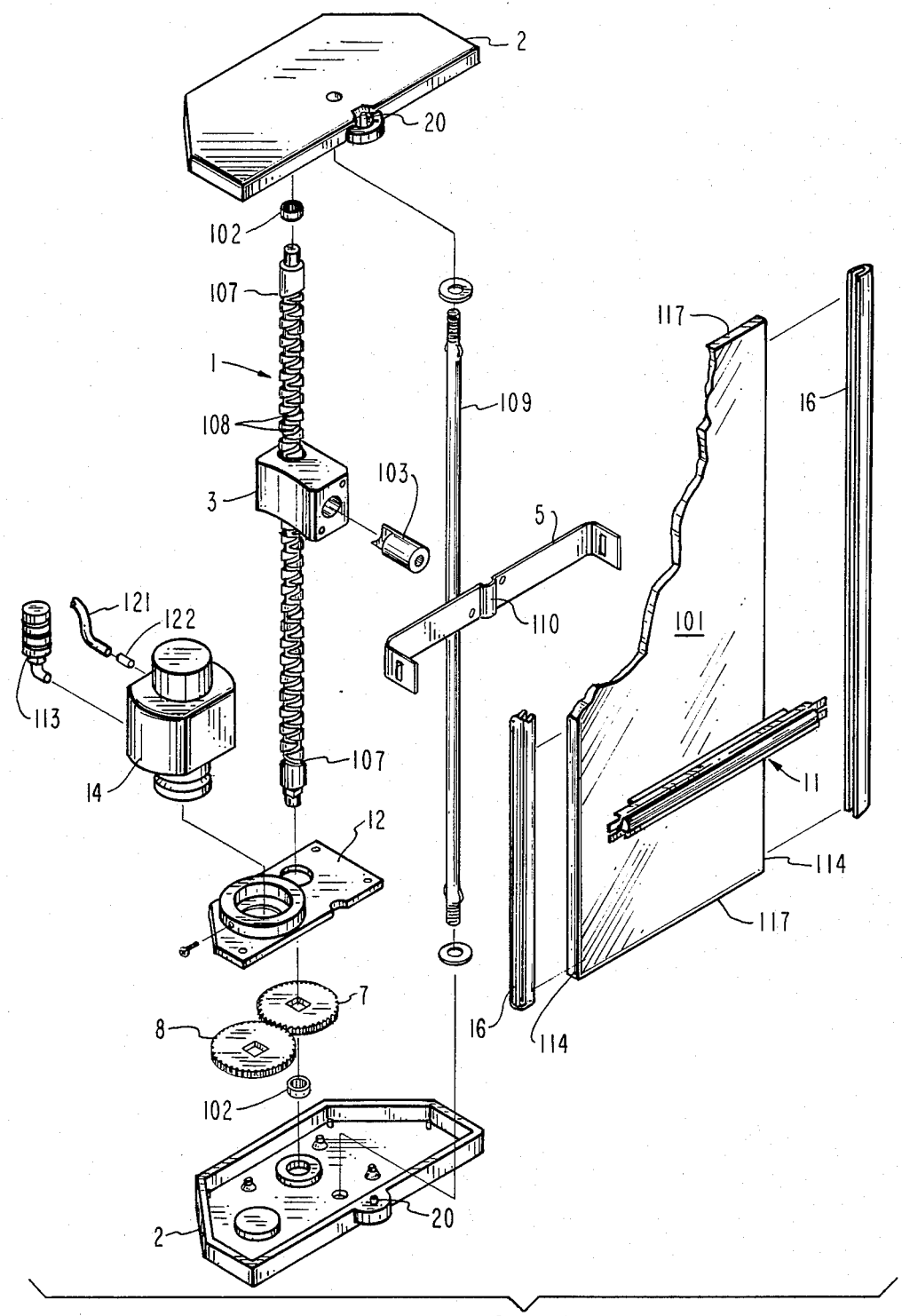
FIG. 2 is an exploded view of a preferred embodiment.
Figure 3A:
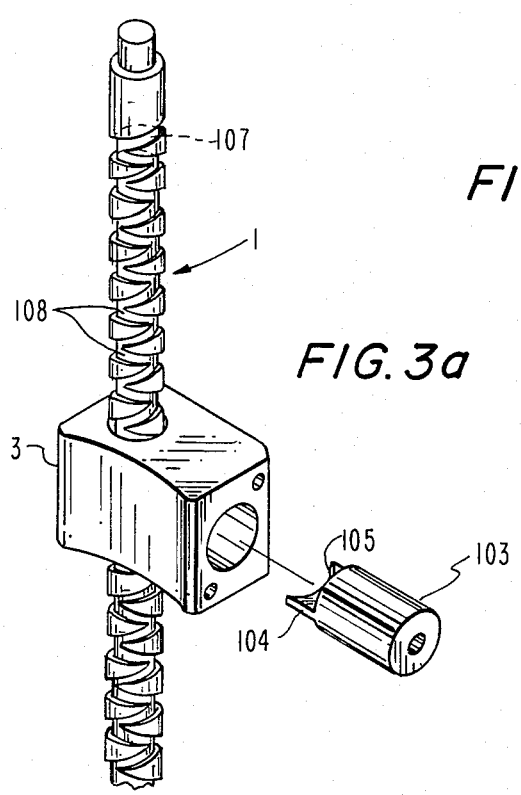
FIG. 3a is a close-up view of the improved oscillating mechanism.
Figure 3B:
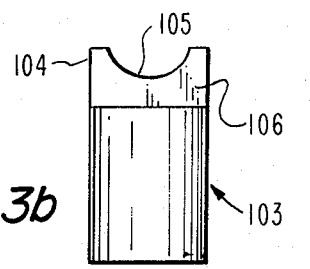
FIG. 3b and 3c are close-up views of the tanged cylinder.
Figure 3C:
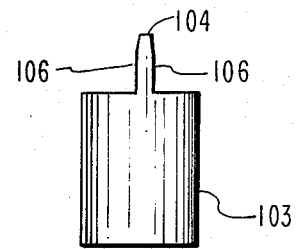
Figure 3D:
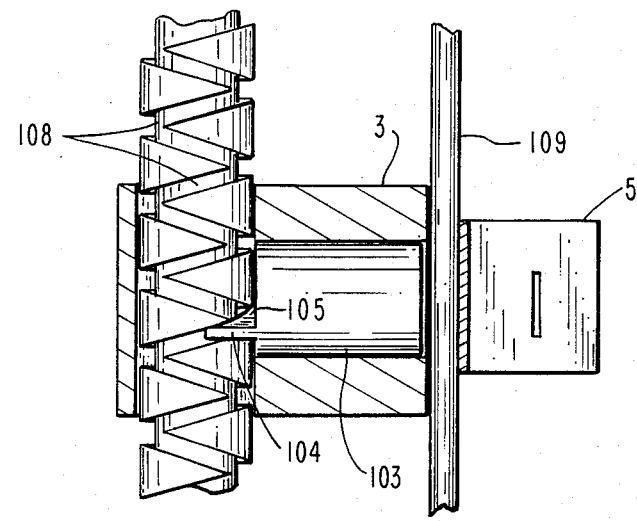
FIG. 3d is a cut-away view of the oscillating mechanism.
Figure 5:
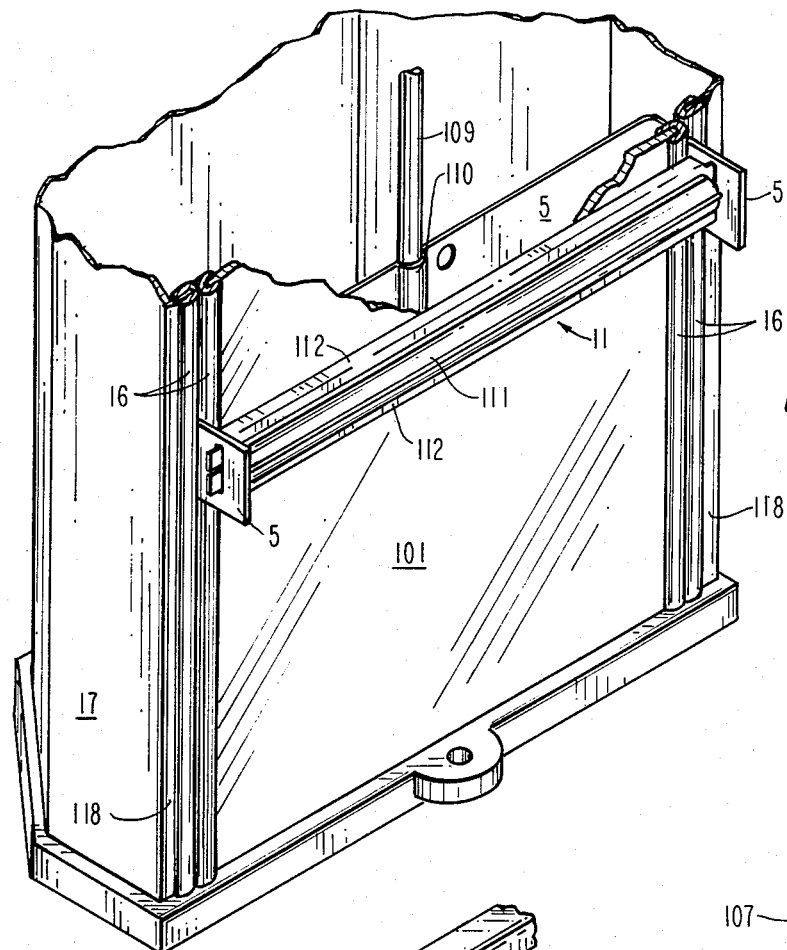
FIG. 5 is a cut-away view across a plane midway between the end plates.

With reference to the drawings, the preferred embodiments of the present invention are described as follows:

Referring to FIG. 1, an overall view of the entire device, and FIG. 2, the present invention, in a general sense, incorporates a mirror (101) having a mirrored surface, an inside surface which faces the drive mechanism, oppositely-disposed side portions (114), and oppositely-disposed end portions (117). Attached to the mirror are upper and lower end plates (2). The connection of the end plates (2) to the mirror (101) may include a seal or sealing means. The assembly may also include a concave shield enclosure (17) housing an oscillating drive mechanism and having longitudinal side portions (118). The concave shield enclosure (17) may be sealably attached to the mirror (101). The oscillating drive mechanism transmits motion through a bracket (5) which is attached at both ends to a wiper (11). As is shown, integrally molded nozzles (20) may be integrated in the end plates (2). These nozzles (20) are positioned in such a way as to be capable of spraying water or some other substance onto the mirror (101) so as to flush the mirror (101) and allow it to be cleared or deiced. The nozzles (20) are optimally positioned so as to spray onto the mirror (101) from opposing directions. The spraying action of the nozzles may be independently controlled by conventional means, or there may be an interconnection to the typical windshield washer system found on most vehicles. This interconnection will result in actuation of the spraying of the nozzles (20) whenever the windshield washer system is activated.

Deicing of the mirror (101) may also be accomplished by means of a heating element. This heating element may be a device such as a resistance pod attached or glued to the inside surface of the mirror (101), or any other means of heating such as a heating coil plate placed within the sealed volume. Such heating means may be held in place against the inside surface of the mirror by bosses formed on the end plates.

Referring to FIG. 2, the exploded view, the entire assembly is designed to minimize the number of parts and address manufacturing needs. The helical screw (1) is disposed between the upper and lower end plates (2) in a centrally located fashion so as to minimize the distance from which oscillating motion must be transferred. The helical screw (1) is attached to the upper and lower end plates (2) by means of bearings (102) or other such anti-friction means. Either an electric or pneumatic (14) motor is attached to the lower end plate (2) so as to transmit rotational motion through a motor gear (8) to the screw drive gear (7) and thereby to the helical screw (1).

Referring to FIGS. 3a through 3d the means for oscillating the wiper (11) includes a helical screw (1) which transmits oscillating motion through a nut (3) and a tanged cylinder (103). As is shown, the tanged cylinder (103) includes a tooth (104) which has a concave surface (105). The tooth has oppositely-disposed side surfaces (106). In addition, the concave surface (105) may be elliptically shaped so as to promote greater contact with the grooves (108) of the helical screw (1). Referring to the helical screw (1), the screw incorporates both ascending and descending spiral grooves (108). The elliptical surface of the tanged cylinder (103) has the proper ellipticity for the lead on the ascending and descending spiral grooves (108) of the helical screw (1). These ascending and descending spiral grooves (108) may be positioned in such a fashion so that they constantly cross along a consistent line along the surface of the helical screw (1). This is desirable to allow simple molding of the helical screw (1).

Figure 4:
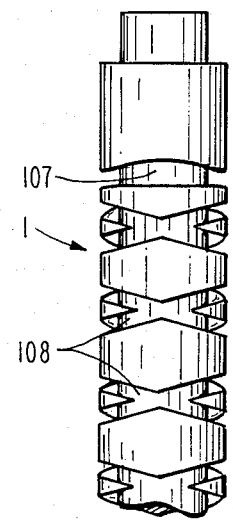
FIG. 4 is a close-up view of the reversing grooves of the helical screw.

Referring to FIG. 4, the helical screw (1) also incorporates progressively flaired reversing grooves (107) at both ends. These reversing grooves (107) provide a connection between the ascending and descending spiral grooves (108) and should be positioned at an angle 90 degrees from the crossing point of the ascending and descending spiral grooves (108) if the helical screw (1) is to be easily molded. The reversing grooves (107) are positioned on opposite ends of the helical screw (1). These reversing grooves (107) are progressively flaired in such a manner that the tooth (104) of the tanged cylinder (103) can rotate from the ascending to the descending grooves (108) without restriction. In this manner, the reversing grooves (107) allow the tooth (104) of the tanged cylinder (103) to have a concave surface (105) which extends throughout an angle which is greater than traditionally utilized by the pin devices currently in use. This enhances the structural integrity of those members which transmit oscillation.

Referring to FIGS. 3a through 3d, it can be seen that the concave surface (105) of the tanged cylinder (103) consists of an arc which may be elliptically shaped. This arc subtends some angle about a central point positioned at the intersection of the central axis of the tanged cylinder (103) and the line between the focii of the ellipse or the central point of the circle defining the concave surface (105). The tooth (104) of the tanged cylinder (103) may be constructed in such a manner that the width of the tooth is at least equal to the inner diameter of the helical screw (1), such inner diameter being defined by the bottom of the ascending and descending grooves (108). In this manner it is possible for the concave surface (105) of the tooth (104) to contact the bottom and sides of the ascending and descending grooves (108) of the helical screw (1) throughout an angle of up to 180 degrees with respect to the central axis of the helical screw (1). This allows enhanced force transmission characteristics, improved reliability and improved durability over existing pin designs, and allows the tooth (104) and the tanged cylinder (103) to be made of easily moldable material such as a plastic. This angle throughout which the tooth (104) contacts the bottom and sides of the ascending and descending grooves (108) is much greater than traditional pin mechanisms which make such contact only about a minimal range, typically a few degrees. As the angle of contact increases, naturally so does the importance of the elliptically-shaped concave surface (105) of the tooth (104) of the tanged cylinder (103).

Referring to the nut (3) and the tanged cylinder (103), as in all helical screw mechanisms, there must be a guide rod (109). In a preferred embodiment, the guide rod (109) also serves as the sole means for connecting and holding in place the upper and lower end plates (2) to both the concave shield enclosure (17) and the mirror (101). The guide rod (109) also serves the function of maintaining the nut (3) from rotating about the helical screw (1). This is accomplished by means of a bracket (5) which not only holds the tanged cylinder (103) inside the nut (3) and against the helical screw (1), but the bracket (5) also is designed to include a sheath portion (110) which slidably connects to the guide rod (109). Naturally, the sheath portion may include some antifriction means or lubrication means to enhance the slidable connection to the guide rod (109).

As is shown, in the preferred embodiment depicted in FIG. 2, the bracket (5) is constructed in such a manner as to have first and second ends which connect to the wiper (11). By fabricating the bracket (5) from a sheet of resilient material such as 17-7 spring steel sheet metal, the first and second ends of the bracket (5) can be as thin as possible and can be displaced laterally as will be explained later and yet firmly maintain their original positions. The thinness of the material enhances the sealing characteristics by minimizing the necessary space between the oppositely-disposed side portions (114) of the mirror (101) and the longitudinal side portions (118) of the concave shield enclosure (17). This permits enhanced sealing of the enclosed volume containing the helical screw (1). This seal is affected by means of yieldable weather strips (16) or other such sealing means between which the first and second ends of the bracket (5) slide.

As mentioned earlier, connected to the first and second ends of the bracket (5) are the ends of the wiper (11). While, naturally, many methods of connecting the wiper (11) to the bracket (5) are possible, including pin, spring and other such mechanisms, in a preferred embodiment the ends of the wiper (11) are merely slid into slots on the first and second ends of the bracket (5). This connection is maintained by the fact that the wiper (11) is longer than the distance between the undisplaced ends of the bracket (5). To allow sufficient displacement of the ends of the bracket (5) so as to be able to remove and replace the wiper (11), the weather strip (16) is sufficiently thick and yieldable.

Figure 6:
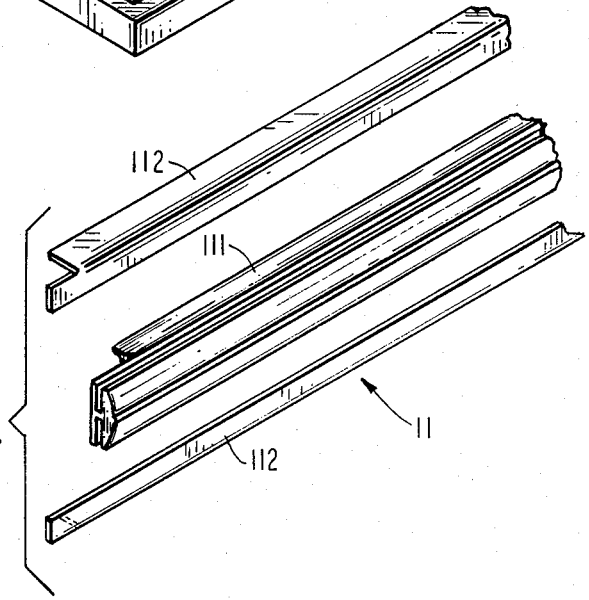
FIG. 6 is an exploded view of the wiper.

Referring to the wiper (11), as shown in FIG. 6, the embodiment shown consists of a yieldable blade portion (111) and two supports (112). As in typical wiper mechanisms, the supports (112) are designed so as to slide into slots on the blade. While in traditional wiper mechanisms the supports may be flat spring metal, in this embodiment, the structural characteristics of the support (112) are enhanced through use of right angle bends along a substantial portion of the length of the supports (112). This enhances the pressure of the blade (111) against all portions of the mirror (101) and is important because the outside surface of the mirror (101) is flat and typically does not include a curved surface. Only the ends of each support (112) are flat as this portion must slide into the slots on the first and second ends of the bracket (5). Naturally, a curved mirrored surface is possible, specifically to enhance the angle through which viewing is possible. As shown in FIG. 6, the two supports (112) are not joined, rather for ease of manufacture and use, they are separate members which may be reused. In this fashion, readily available wiper blades may be used.

Referring to FIG. 2, the exploded view, either electric or pneumatic (14) motors may be used. Each such motor requires that an appropriate source of energy be externally supplied by means of wires or an air line (121). Such motors will naturally be controlled remotely from within the cab of the vehicle involved. Such motors are mounted to the lower end plate (2) by means of a mounting bracket (12) which also serves to retain the motor gear (8) in contact with the screw drive gear (7). In the event a pneumatic motor is used, a muffler (113) may be utilized. This muffler (113) may be placed either outside the enclosed volume defined by the mirror (101), the concave shield enclosure (17), and the end plates (2), or may be within such enclosed volume. In the event the muffler (113) is placed within the enclosed volume, the expended motor exhaust will then exit the enclosed volume by passing between the weather strips (16) thus enhancing the sealing characteristics of an embodiment of the device. Also in the event a pneumatic motor is used, an orifice insert (120) may be inserted within the air line (121) so as to prevent overspeed if the air pressure ever exceeds the desired amount. This orifice insert (120) is desirable because typical air supplies are frequently loosely regulated. The orifice insert (120) has an orifice which is sized according to the appropriate overspeed limitations.

We claim:

1. A wiping mirror assembly comprising:
   a. a mirror having inside and outside surfaces, oppositely-disposed side portions, and oppositely-disposed end portions;
   b. a means for wiping said mirror disposed between and perpendicular to said side portions of the mirror and having first and second ends;
   c. an upper end plate and a lower end plate, said end plates connected to opposite end portions of said mirror;
   d. a means for oscillating said wiper means, said oscillating means having a helical screw disposed between said upper and lower end plates having ascending and descending threads; and
   e. a bracket connected to said oscillating means and having first and second ends which are connected to said first and second ends of said wiping means, respectively.

2. A wiping mirror assembly comprising:
   a. a mirror having inside and outside surfaces, oppositely-disposed side portions, and oppositely-disposed end portions;
   b. a means for wiping said mirror disposed between and perpendicular to said side portions of the mirror and having first and second ends;
   c. an upper end plate and a lower end plate, said end plates connected to opposite end portions of said mirror;
   d. a means for oscillating said wiper means, said oscillating means having a helical screw disposed between said upper and lower end plates;
   e. a bracket connected to said oscillating means and having first and second ends of said wiping means, respectively; and
   f. no more than one connecting rod which holds the mirror and the upper and lower end plates securely in place.

3. A wiping mirror assembly as described in claim 1 wherein said helical screw is made by molding.

4. A wiping mirror assembly as described in claim 2 wherein said upper and lower end plates are identical.

5. A wiping mirror assembly comprising:
   a. a mirror having inside and outside surfaces, oppositely-disposed side portions, and oppositely-disposed end portions;
   b. a means for wiping said mirror disposed between and perpendicular to said side portions of the mirror and having first and second ends;
   c. an upper end plate and a lower end plate, said end plates connected to opposite end portions of said mirror;
   d. a means for oscillating said wiper means, said oscillating means comprising:
      i. a helical screw disposed between said upper and lower end plates;
      ii. a nut slidably connected about the cylindrical axis of said helical screw;
      iii. a tanged cylinder rotatably placed through said nut, and having first and second ends, said first end of the tanged cylinder slidably engaged against the helical screw; and
      iv. a means for rotating said helical screw; and
   e. a bracket connected to said oscillating means and having first and second ends which are connected to said first and second ends of said wiping means, respectively.

6. A wiping mirror assembly comprising:
   a. a mirror having inside and outside surfaces, oppositely-disposed side portions, and oppositely-disposed end portions;
   b. a means for wiping said mirror disposed between and perpendicular to said side portions of the mirror and having first and second ends;
   c. an upper end plate and a lower end plate, said end plates connected to opposite end portions of said mirror;
   d. no more than one connecting rod which holds the mirror and the upper and lower end plates securely in place and has a cylindrical axis;
   e. a means for oscillating said wiper means, said oscillating means comprising:
      i. a helical screw disposed between said upper and lower end plates;
      ii. a nut slidably connected about the cylindrical axis of both said helical screw and said connecting rod;
      iii. a tanged cylinder rotatably placed through said nut, and having first and second ends, said first end of the tanged cylinder slidably engaged against the helical screw;
      iv. a means for rotating said helical screw; and
   f. a bracket connected to said oscillating means and having first and second ends which are connected to said first and second ends of said wiping means, respectively.

7. A wiping mirror assembly comprising:
   a. a mirror having inside and outside surfaces, oppositely-disposed side portions, and oppositely-disposed end portions;
   b. a means for wiping said mirror disposed between and perpendicular to said side portions of the mirror and having first and second ends;
   c. an upper end plate and a lower end plate, said end plates connected to opposite end portions of said mirror and being identical;
   d. a means for oscillating said wiper means, said oscillating means comprising:
      i. a helical screw disposed between said upper and lower end plates;
      ii. a nut slidably connected about the cylindrical axis of said helical screw;
      iii. a tanged cylinder rotatably placed through said nut, and having first and second ends, said first end of the tanged cylinder slidably engaged against the helical screw; and
      iv. a means for rotating said helical screw; and
   e. a bracket connected to said oscillating means and having first and second ends which are connected to said first and second ends of said wiping means, respectively.

8. A wiping mirror assembly comprising:
   a. a mirror having inside and outside surfaces, oppositely-disposed side portions, and oppositely-disposed end portions;
   b. a means for wiping said mirror disposed between and perpendicular to said side portions of the mirror and having first and second ends;

c. an upper end plate and a lower end plate, said end plates connected to opposite end portions of said mirror and being identical;

d. no more than one connecting rod which holds the mirror and the upper and lower end plates securely in place and has a cylindrical axis;

e. a means for oscillating said wiper means, said oscillating means comprising:

i. a helical screw disposed between said upper and lower end plates;

ii. a nut slidably connected about the cylindrical axis of both said helical screw and said connecting rod;

iii. a tanged cylinder rotatably placed through said nut, and having first and second ends, said first end of the tanged cylinder slidably engaged against the helical screw; and iv. a means for rotating said helical screw; and f. a bracket connected to said oscillating means and having first and second ends which are connected to said first and second ends of said wiping means, respectively.

9. A wiping mirror assembly as described in claims 5, 6, 7, or 8 and further comprising a means for heating said mirror.

10. A wiping mirror assembly as described in claim 9 wherein said heating means comprises a resistance pad attached to the inside surface of said mirror.

11. A wiping mirror assembly as described in claim 4 wherein said upper and lower end plates have integral molded nozzles which are directed toward the mirror.

12. An oscillating drive mechanism comprising:

a. a helical screw having first and second ends and having oppositely rotating main grooves which are joined near said first and second ends by reversing grooves which are progressively wider than said main grooves;

b. a guide rod having its central axis parallel to the central axis of the helical screw;

c. a nut slidably connected about the cylindrical axis of both said helical screw and said guide rod;

d. a tanged cylinder rotatably placed through said nut, and having first and second ends, said first end of the tanged cylinder slidably engaged against said main grooves of the helical screw wherein said first end of said tanged cylinder comprises a concave tooth having a concave surface which is elliptically shaped; and e. a means for rotating said helical screw.

13. An oscillating drive mechanism as described in and further comprising a means for transmitting movement of the nut and tanged cylinder which also holds the tanged cylinder against the helical screw.

14. An oscillating drive mechanism comprising:

a. a helical screw having first and second ends and having oppositely rotating main grooves which are joined near said first and second ends by reversing grooves which are progressively wider than said main grooves;

b. a guide rod having its central axis parallel to the central axis of the helical screw;

c. a nut slidably connected about the cylindrical axis of both said helical screw and said guide rod;

d. a tanged cylinder rotatably placed through said nut, and having first and second ends, said first end of the tanged cylinder slidably engaged against said main grooves of the helical screw and wherein said first end of said tanged cylinder comprises a concave tooth, said tooth having a concave surface which engages the main grooves of said helical screw throughout an angle about the central axis of the helical screw that is from 10 degrees to 180 degrees;

e. a means for rotating said helical screw; and f. a means for transmitting movement of the nut and tanged cylinder which also holds the tanged cylinder against the helical screw.

15. An oscillating drive mechanism as described in claim 12 wherein said helical screw is made by molding.

16. An oscillating drive mechanism as described in claim 14, wherein said helical screw, said nut and said tanged cylinder are made of nonmetallic material.

17. A wiping mirror assembly comprising:

a. a mirror having inside and outside surfaces, oppositely-disposed side portions, and oppositely-disposed end portions;

b. a means for wiping said mirror disposed between and perpendicular to said side portions of the mirror and having first and second ends;

c. an upper end plate and a lower end plate, said end plates connected to opposite end portions of said mirror;

d. a means for oscillating said wiper means, said oscillating means comprising:

i. a helical screw disposed between said upper and lower end plates, having first and second ends, and having oppositely rotating main grooves which are joined near said first and second ends by reversing grooves which are progressively wider than said main grooves;

ii. a guide rod having its central axis parallel to the central axis of the helical screw;

iii. a nut slidably connected about the cylindrical axis of both said helical screw and said guide rod;

iv. a tanged cylinder rotatably placed through said nut, and having first and second ends, said first end of the tanged cylinder slidably engaged against said main grooves of the helical screw; and v. a means for rotating said helical screw; and e. a bracket connected to said oscillating means and having first and second ends which are connected to said first and second ends of said wiping means, respectively.

18. A wiping mirror assembly comprising:

a. a mirror having inside and outside surfaces, oppositely-disposed side portions, and oppositely-disposed end portions;

b. a means for wiping said mirror disposed between and perpendicular to said side portions of the mirror and having first and second ends;

c. an upper end plate and a lower end plate, said end plates connected to opposite end portions of said mirror;

d. no more than one connecting rod which holds the mirror and the upper and lower end plates securely in place and has a cylindrical axis;

e. a means for oscillating said wiper means, said oscillating means comprising:

i. a helical screw disposed between said upper and lower end plates, having first and second ends, and having oppositely rotating main grooves which are joined near said first and second ends by reversing grooves which are progressively wider than said main grooves;

ii. a guide rod having its central axis parallel to the central axis of the helical screw;

iii. a nut slidably connected about the cylindrical axis of both said helical screw and said guide rod;

iv. a tanged cylinder rotatably placed through said nut, and having first and second ends, said first end of the tanged cylinder slidably engaged against said main grooves of the helical screw; and v. a means for rotating said helical screw; and f. a bracket connected to said oscillating means and having first and second ends which are connected to said first and second ends of said wiping means, respectively.

19. A wiping mirror assembly comprising:

a. a mirror having inside and outside surfaces, oppositely-disposed side portions, and oppositely-disposed end portions;

b. a means for wiping said mirror disposed between and perpendicular to said side portions of the mirror and having first and second ends;

c. an upper end plate and a lower end plate, said end plates connected to opposite end portions of said mirror and being identical;

d. a means for oscillating said wiper means, said oscillating means comprising:

i. a helical screw disposed between said upper and lower end plates, having first and second ends, and having oppositely rotating main grooves which are joined near said first and second ends by reversing grooves which are progressively wider than said main grooves;

ii. a guide rod having its central axis parallel to the central axis of the helical screw;

iii. a nut slidably connected about the cylindrical axis of both said helical screw and said guide rod;

iv. a tanged cylinder rotatably placed through said nut, and having first and second ends, said first end of the tanged cylinder slidably engaged against said main grooves of the helical screw; and v. a means for rotating said helical screw; and e. a bracket connected to said oscillating means and having first and second ends which are connected to said first and second ends of said wiping means, respectively.

20. A wiping mirror assembly comprising:

a. a mirror having inside and outside surfaces, oppositely-disposed side portions, and oppositely-disposed end portions;

b. a means for wiping said mirror disposed between and perpendicular to said side portions of the mirror and having first and second ends;

c. an upper end plate and a lower end plate, said end plates connected to opposite end portions of said mirror and being identical;

d. no more than one connecting rod which holds the mirror and the upper and lower end plates securely in place and has a cylindrical axis;

e. a means for oscillating said wiper means, said oscillating means comprising:

i. a helical screw disposed between said upper and lower end plates, having first and second ends, and having oppositely rotating main grooves which are joined near said first and second ends by reversing grooves which are progressively wider than said main grooves;

ii. a guide rod having its central axis parallel to the central axis of the helical screw and which also functions as said connecting rod;

iii. a nut slidably connected about the cylindrical axis of both said helical screw and said guide rod;

iv. a tanged cylinder rotatably placed through said nut, and having first and second ends, said first end of the tanged cylinder slidably engaged against said main grooves of the helical screw; and v. a means for rotating said helical screw; and f. a bracket connected to said oscillating means and having first and second ends which are connected to said first and second ends of said wiping means, respectively.

21. A wiping mirror assembly as described in claims 17, 18, 19, or 20 wherein said tooth has a concave surface which is elliptically shaped.

22. A wiping mirror assembly as described in claim 21 wherein said tooth has a concave surface which engages the grooves of said helical screw throughout an angle about the central axis of the helical screw that is from 10 degrees to 180 degrees.

23. A wiping mirror assembly as described in claims 5, 6, 7, or 8 wherein said bracket also holds the tanged cylinder against the helical screw.

24. A wiping mirror assembly comprising:

a. a mirror having inside and outside surfaces, oppositely-disposed side portions, and oppositely-disposed end portions;

b. a means for wiping said mirror disposed between and perpendicular to said side portions of the mirror and having first and second ends, said wiping means comprising;

i. a flexible wiper responsive to the surface of said mirror and having oppositely-disposed long and short sides; and ii. two supports engaged against the long sides of the wiper each support having a first and second end which is connected to said first and second ends of said bracket, respectively;

c. an upper end plate and a lower end plate, said end plates connected to opposite end portions of said mirror;

d. a means for oscillating said wiper means, said oscillating means having a helical screw disposed between said upper and lower end plates; and e. a bracket connected to said oscillating means and having first and second ends which are connected to said first and second ends of said wiping means, respectively.

25. A wiping mirror assembly as described in claims 17, 18, 19, or 20 wherein said wiping means comprises:

i. a flexible wiper responsive to the surface of said mirror and having oppositely-disposed long and short sides; and ii. two supports engaged against the long sides of the wiper each support having a first and second end which is connected to said first and second ends of said bracket, respectively, and each support having right angle bends along a substantial portion of their length.

26. A wiping mirror assembly as described in claim 21 wherein said wiping means comprises:

a. a flexible wiper responsive to the surface of said mirror and having oppositely disposed long and short sides; and b. two supports engaged against the long sides of the wiper each support having a first and second end which is connected to said first and second end of said bracket, respectively, and each support having right angle bends along a substantial portion of their length.

27. A wiping mirror assembly as described in claim 22 wherein said wiping means comprises:
  a. a flexible wiper responsive to the surface of said mirror and having oppositely disposed long and short sides; and
  b. two supports engaged against the long sides of the wiper each support having a first and second end which is connected to said first and second end of said bracket, respectively, and each support having right angle bends along a substantial portion of their length.

28. A wiping mirror assembly as described in claim 23 wherein said wiping means comprises:
  a. a flexible wiper responsive to the surface of said mirror and having oppositely disposed long and short sides; and
  b. two supports engaged against the long sides of the wiper each support having a first and second end which is connected to said first and second end of said bracket, respectively, and each support having right angle bends along a substantial portion of their length.

29. A wiping mirror assembly as described in claim 24 wherein said bracket is made from a sheet of resiliant material.

30. A wiping mirror assembly as described in claims 5, 6, 7, or 8 wherein said rotating means comprises an electric motor and a source of electrical energy.

31. A wiping mirror assembly as described in claims 5, 6, 7, or 8 wherein said rotating means comprises a pneumatic motor and an air supply connected to said pneumatic motor by an air line.

32. A wiping mirror assembly as described in claim 31 and further comprising a muffler attached to said pneumatic motor.

33. A wiping mirror assembly as described in claim 32 and further comprising an orifice to insert within said air line.

34. A sealed wiping mirror assembly comprising:
  a. a mirror having oppositely-disposed side portions and oppositely-disposed end portions;
  b. a means for wiping said mirror disposed between and perpendicular to said side portions of the mirror and having first and second ends;
  c. an upper end plate and a lower end plate, said end plates sealably connected to opposite end portions of said mirror;
  d. a concave shield enclosure sealably connected to said upper and lower end plates so as to define an enclosed volume behind the mirror, said concave shield enclosure having longitudinal side portions;
  e. a means for oscillating said wiper means, said oscillating means being contained within said enclosed volume;
  f. a bracket connected to said oscillating means and having first and second ends which are connected to said first and second ends of said wiping means, respectively; and
  g. a means for sealing said longitudinal side portions of the shield enclosure against the side portions of the mirror while allowing oscillatory movement of the bracket through said sealing means.

35. A sealed wiping mirror assembly as described in claim 34 and further comprising no more than one connecting rod which holds the mirror, the upper and lower end plates, and the shield enclosure securely in place.

36. A sealed wiping mirror assembly comprising:
  a. a mirror having oppositely-disposed side portions and oppositely-disposed end portions;
  b. a means for wiping said mirror disposed between and perpendicular to said side portions of the mirror and having first and second ends comprising:
    i. a flexible wiper responsive to the surface of said mirror and having oppositely disposed long and short sides; and
    ii. two supports engaged against the long sides of the wiper, each support having a first and a second end which is connected to said first and second ends of said bracket, respectively;
  c. an upper end plate and a lower end plate, said end plates sealably connected to opposite end portions of said mirror;
  d. a concave shield enclosure sealably connected to said upper and lower end plates so as to define an enclosed volume behind the mirror, said concave shield enclosure having longitudinal side portions;
  e. a means for oscillating said wiper means, said oscillating means being contained within said enclosed volume;
  f. a bracket connected to said oscillating means and having first and second ends which are connected to said first and second ends of said wiping means, respectively; and
  g. a means for sealing said longitudinal side portions of the shield enclosure against the side portions of the mirror while allowing oscillatory movement of the bracket through said sealing means.

37. A sealed wiping mirror assembly as described in claim 36 and further comprising no more than one connecting rod which holds the mirror, the upper and lower end plates, and the shield enclosure securely in place.

38. A sealed wiping mirror assembly as described in claim 36 and further comprising no more than one connecting rod which holds the mirror, the upper and lower end plates, and the shield enclosure securely in place.

39. A sealed wiping mirror assembly as described in claims 36, 37, or 38 wherein said support has a right angle bend along a substantial portion of its entire length.

40. A sealed wiping mirror assembly as described in claim 34 wherein said bracket is made from a sheet of resiliant material.

41. A sealed wiping mirror assembly as described in claim 34 wherein said rotating means comprises an electric motor and a source of electrical energy.

42. A sealed wiping mirror assembly as described in claim 34 wherein said rotating means comprises a pneumatic motor, and an air supply connected to said pneumatic motor by an air line.

43. A sealed wiping mirror assembly as described in claim 34 and further comprising a muffler attached to said pneumatic motor and an orifice within said air line.

44. A sealed wiping mirror assembly as described in claim 43 wherein said muffler is outside said enclosed volume.

45. A sealed wiping mirror assembly as described in claim 43 wherein said muffler is within said enclosed volume.

46. A sealed wiping mirror assembly as described in claim 34 wherein said upper and lower end plates are identical.

47. A sealed wiping mirror assembly comprising:
  a. a mirror having oppositely-disposed side portions and oppositely-disposed end portions;
  b. a means for wiping said mirror disposed between and perpendicular to said side portions of the mirror and having first and second ends;
  c. an upper end plate and a lower end plate, said end plates sealably connected to opposite end portions of said mirror;
  d. a concave shield enclosure sealably connected to said upper and lower end plates so as to define an enclosed volume behind the mirror, said concave shield enclosure having longitudinal side portions;
  e. a means for oscillating said wiper means, said oscillating means being contained within said enclosed volume and comprising:
  i. a helical screw having first and second ends and having oppositely rotating main grooves which are joined near said first and second ends by reversing grooves which are progressively wider than said main grooves;
  ii. a guide rod having its central axis parallel to the central axis of the helical screw;
  iii. a nut slidably connected about the cylindrical axis of both said helical screw and said guide rod;
  iv. a tanged cylinder rotatably placed through said nut, and having first and second ends, said first end of the tanged cylinder slidably engaged against said main grooves of the helical screw;
  v. a means for rotating said helical screw; and
  f. a bracket connected to said oscillating means and having first and second ends which are connected to said first and second ends of said wiping means, respectively; and
  g. a means for sealing said longitudinal side portions of the shield enclosure against the side portions of the mirror while allowing oscillatory movement of the bracket through said sealing means.

48. A sealed wiping mirror assembly as described in claim 47 and further comprising a connecting rod which holds the mirror, the upper and lower end plates, and the shield enclosure securely in place which is also said guide rod.

49. A sealed wiping mirror assembly as described in claim 47 wherein said first end of said tanged cylinder comprises a concave tooth, said tooth having a concave surface which is elliptically shaped.

50. A sealed wiping mirror assembly as described in claims 47 or 49 wherein said first end of said tanged cylinder comprises a concave tooth, said tooth having a concave surface which engages the main grooves of said helical screw throughout an angle about the central axis of the helical screw that is from 10 degrees to approximately 180 degrees.

51. A sealed wiping mirror assembly as described in claims 47 or 49 and further comprising a means for transmitting movement of the nut and tanged cylinder which also holds the tanged cylinder against the helical screw.

52. A sealed wiping mirror assembly as described in claims 47 or 49 wherein said helical screw is made by molding.

53. A sealed wiping mirror assembly as described in claims 47 or 49 wherein said helical screw, said nut and said tanged cylinder are made of nonmetallic material.

54. A sealed wiping mirror assembly as described in claim 47 wherein said oppositely-rotating main grooves cross at points along a straight line on the surface of the helical screw and wherein said reversing grooves are centered about a straight line on the surface of the helical screw which is on a radius that forms an angle about the central axis of the helical screw that is 90 degrees from the radius of the straight line along which the main grooves cross.

55. A sealed wiping mirror assembly as described in claim 34 wherein said sealing means comprises flexible molding pieces placed on each of said side portions of said mirror and flexible molding pieces placed on each of said longitudinal side portions of said shield enclosure and where said molding pieces are responsive to each other so as to create a seal.

56. A sealed wiping mirror assembly comprising:
  a. a mirror;
  b. a means for wiping said mirror;
  c. an enclosure sealably connected to said mirror, defining an enclosure volume behind the mirror, and having an opening;
  d. a means for oscillating said wiper means, said oscillating means being contained within said enclosed volume wherein said oscillating means comprises an oscillating drive mechanism as described in claim 11; and
  e. a means for sealing said opening while allowing said connection from said oscillating means to said wiping means to pass through said sealing means.

* * * * *

UNITED STATES PATENT AND TRADEMARK OFFICE
CERTIFICATE OF CORRECTION

PATENT NO. : 4,873,740

DATED : October 17, 1989

INVENTOR(S) : Michael C. Vahrenwald et al

It is certified that error appears in the above-identified patent and that said Letters Patent is hereby corrected as shown below:

Claim 13, line 1, after "as described in" insert --12--.

Signed and Sealed this

Twenty-second Day of May, 1990

Attest:

HARRY F. MANBECK, JR.

Attesting Officer

Commissioner of Patents and Trademarks